United States Patent
Hammock

(10) Patent No.: US 10,704,529 B2
(45) Date of Patent: Jul. 7, 2020

(54) SYSTEM AND METHOD FOR AIRBORNE ATMOSPHERIC WATER GENERATION

(71) Applicant: Cory Jacob Hammock, Salt Lake City, UT (US)

(72) Inventor: Cory Jacob Hammock, Salt Lake City, UT (US)

(73) Assignee: CHAAC Technologies, Inc., Salt Lake City, UT (US)

( * ) Notice: Subject to any disclaimer, the term of this patent is extended or adjusted under 35 U.S.C. 154(b) by 76 days.

(21) Appl. No.: 16/152,786

(22) Filed: Oct. 5, 2018

(65) Prior Publication Data
US 2020/0109695 A1   Apr. 9, 2020

(51) Int. Cl.
| | | |
|---|---|---|
| *F03B 17/06* | (2006.01) | |
| *A01G 15/00* | (2006.01) | |
| *E03B 3/28* | (2006.01) | |
| *F01K 11/02* | (2006.01) | |
| *F01K 9/00* | (2006.01) | |

(52) U.S. Cl.
CPC .............. *F03B 17/06* (2013.01); *A01G 15/00* (2013.01); *E03B 3/28* (2013.01); *F01K 9/003* (2013.01); *F01K 11/02* (2013.01)

(58) Field of Classification Search
CPC ................................... E03B 3/28; F03B 13/06
See application file for complete search history.

(56) References Cited

U.S. PATENT DOCUMENTS

| | | | | |
|---|---|---|---|---|
| 3,658,278 A | * | 4/1972 | Batchelor | B64B 1/40 244/33 |
| 3,748,867 A | * | 7/1973 | Bel Hamri | C02F 1/10 62/271 |
| 4,092,827 A | * | 6/1978 | Schneider | B64B 1/50 137/236.1 |
| 4,757,687 A | * | 7/1988 | Nasser | F01K 27/005 60/641.11 |
| 5,517,829 A | * | 5/1996 | Michael | C02F 9/005 62/272 |
| 6,434,942 B1 | * | 8/2002 | Charlton | F01K 27/005 60/641.11 |
| 7,233,078 B2 | * | 6/2007 | Baarman | C02F 1/325 290/43 |
| 7,348,685 B2 | * | 3/2008 | Yi | E02B 9/00 290/43 |
| 9,363,954 B2 | * | 6/2016 | Davidson | A01G 15/00 |
| 2004/0000165 A1 | * | 1/2004 | Max | B01D 5/0042 62/615 |
| 2007/0028769 A1 | * | 2/2007 | Eplee | B01D 53/06 95/113 |
| 2009/0008940 A1 | * | 1/2009 | Strain | F03B 13/06 290/52 |
| 2010/0253080 A1 | * | 10/2010 | DeAngeles | F03B 13/06 290/52 |

* cited by examiner

*Primary Examiner* — Michael Leslie
*Assistant Examiner* — Matthew Wiblin
(74) *Attorney, Agent, or Firm* — William Gray Mitchell

(57) ABSTRACT

The invention is a system and method for the airborne generation of usable water from atmospheric water vapor and the generation of electric power from and for such system.

12 Claims, 3 Drawing Sheets

SYSTEM AND METHOD FOR AIRBORNE ATMOSPHERIC WATER GENERATION

CROSS REFERENCE TO RELATED APPLICATIONS

Not applicable.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention is a system and method for the airborne generation of usable water from atmospheric water vapor and the generation of electric power from and for such system.

Background of the Invention

Dehumidifying technology was pioneered in an effort to keep indoor humidity levels low, primarily for comfort and reduction in housing/commercial structures. Within geographic areas of high humidity, the technology will convert humidity into water through condensation. With the inclusion of filtering devices, the same technology has become known as atmospheric water generation (AWG).

Atmospheric water generation uses dehumidifying technology with added filters to generate usable and/or potable water. The invention as described and claimed herein is intended for the purposes of environment rejuvenation via on-site atmospheric water reclamation and cloud-to-water conversion technology for uses such as converting humid deserts into vegetated landscapes, generating clean water for human consumption, planetary terraforming and the creation of an artificial water vapor resupply cycle, specifically an augmentation of phyotosynthesis. The airborne AWG device will be capable of forcefully distributing condensed water from clouds and atmospheric water vapor into soils to hydrate plants on land, then repeat the process once the water is reintroduced into the atmosphere.

As with any power device located in a remote or isolated area, power generation is a key problem to be addressed. With the idea of repurposing water into hydrostatic pressure to enable a native power supply, a method can be achieved to use the pressure of condensed water to reduce external (direct current) power consumption and maintenance requirements.

Consisting of water vapor and ice crystals, clouds represent a native supply of water to rejuvenate agricultural and human requirements, even in remote and arid climates. The AWG technology described herein requires airborne lift and suspension to achieve optimal results. Clouds consist of water vapor and, depending on altitude, such condensed water vapor can attract dust, ice, and salt. Atmospheric water conversion can extract select element composites from cloud moisture to produce filtered and potable water for human and agricultural use. The same technology also can be used to prevent severe flooding from storm clouds by controllably removing moisture necessary for progressive rainfall.

With the addition of activated carbon filtering, AWG devices can provide a source of natural and safe drinking water within areas of high humidity. Generally, dehumidifiers output water via a condensation drip into a water receptacle, thus collecting metallic and chemical elements to render the collected water unsafe for drinking. As such, additional filtration mechanisms are required to prepare harvested water for safe human use.

The rate at which water can be produced depends on relative humidity and ambient air temperature and size of the compressor. Atmospheric water generators become more effective as relative humidity and air temperature increase. As a rule of thumb, cooling condensation atmospheric water generators do not work efficiently when the temperature falls below 18.3° C. (65° F.) or the relative humidity drops below 30%. This means that airborne AWG will be most effective in warmer climates, during daylight hours and at low enough altitudes that air temperature does not fall too low. In cooler atmospheres, the invention may comprise heating elements located on the exterior to facilitate vapor condensation in the dehumidifier.

Known AWG systems fail to combine features of self-generating power with water generation, transportation and filtration means feasible for an airborne environment. Applicant's claimed system and methods achieve these objectives for airborne generation, transportation and storage of usable water from atmospheric water vapor.

BRIEF SUMMARY OF THE INVENTION

In a preferred embodiment, a system for airborne atmospheric water generation, comprising an airborne platform connected to a land-based platform, wherein the airborne platform comprises air fans to intake moist atmospheric air, a dehumidifier condenses water from vapor and drains the condensed water to the land-based platform and exhaust air fans to vent dehumidified air back into the atmosphere, and wherein the land-based platform comprises a water turbine and generator for generating power for all electrical components of the system, a collection tank for accumulating condensed water, and an external holding tank.

In another preferred embodiment, the system as described herein, further comprising wherein the condensed water is drained to the land-based platform using a drainage tube comprising a nozzle focused on the water turbine and wherein the water turbine is an impact turbine.

In another preferred embodiment, the system as described herein, further comprising wherein the condensed water is drained to the land-based platform using a drainage tube emptying into a turbine basin, wherein the water turbine is a reaction turbine and fully submerged when operating.

In another preferred embodiment, the system as described herein, further comprising wherein the collection tank comprises a water pump for moving water from the collection tank to the holding tank, such water pump powered by electricity from the generator.

In another preferred embodiment, the system as described herein, wherein a power line from the generator connects to an amplifier in the airborne platform, then extends to one or more capacitors, which capacitor(s) are each connected to one or more air fans.

In another preferred embodiment, the system as described herein, wherein the airborne platform elevates via one or more levitation bladders containing a gas lighter than air.

In another preferred embodiment, the system as described herein, wherein the levitation bladder(s) is one or more hot air balloons, from which the airborne platform suspends.

In another preferred embodiment, the system as described herein, wherein the airborne platform elevates via one or more powered rotors, either alone or in combination with one or more levitation bladders.

In another preferred embodiment, the system as described herein, further comprising a dessicant-type dehumidification system in the airborne platform, either in addition to or in lieu of a compression-type dehumidification system.

In another embodiment, a method of self-powering an atmospheric water generation system comprising the steps of: i. levitating an airborne platform containing a dehumidifier; ii. dehumidifying moist air at altitude; iii. draining condensation from the airborne platform via a drainage tube, thus producing hydrostatic pressure; iv. using hydrostatic pressure to power a water turbine; v. generating electric power from the water turbine; and vi. providing the generated electric power to some or all electronic components of the system.

In another embodiment, the method of self-powering an atmospheric water generation system described herein, wherein the drainage tube comprises a nozzle aimed at the water turbine, and wherein the water turbine is an impact turbine.

In another embodiment, the method of self-powering an atmospheric water generation system described herein, wherein the water turbine is seated in a turbine basin and submerged during system operation, and wherein the water turbine is a reaction turbine.

In another preferred embodiment, a method of hydrostatic power generation comprising the steps of: i. levitating an airborne platform containing a dehumidifier; ii. dehumidifying moist air at altitude; iii. draining condensation from the airborne platform via a drainage tube, thus producing hydrostatic pressure; iv. using hydrostatic pressure to power a water turbine; v. generating electric power from the water turbine; vi. providing the generated electric power to some or all electronic components of the system; and vii transmitting all generated power beyond the system needs to a public or third party power grid.

DETAILED DESCRIPTION OF THE INVENTION

Figure 1:
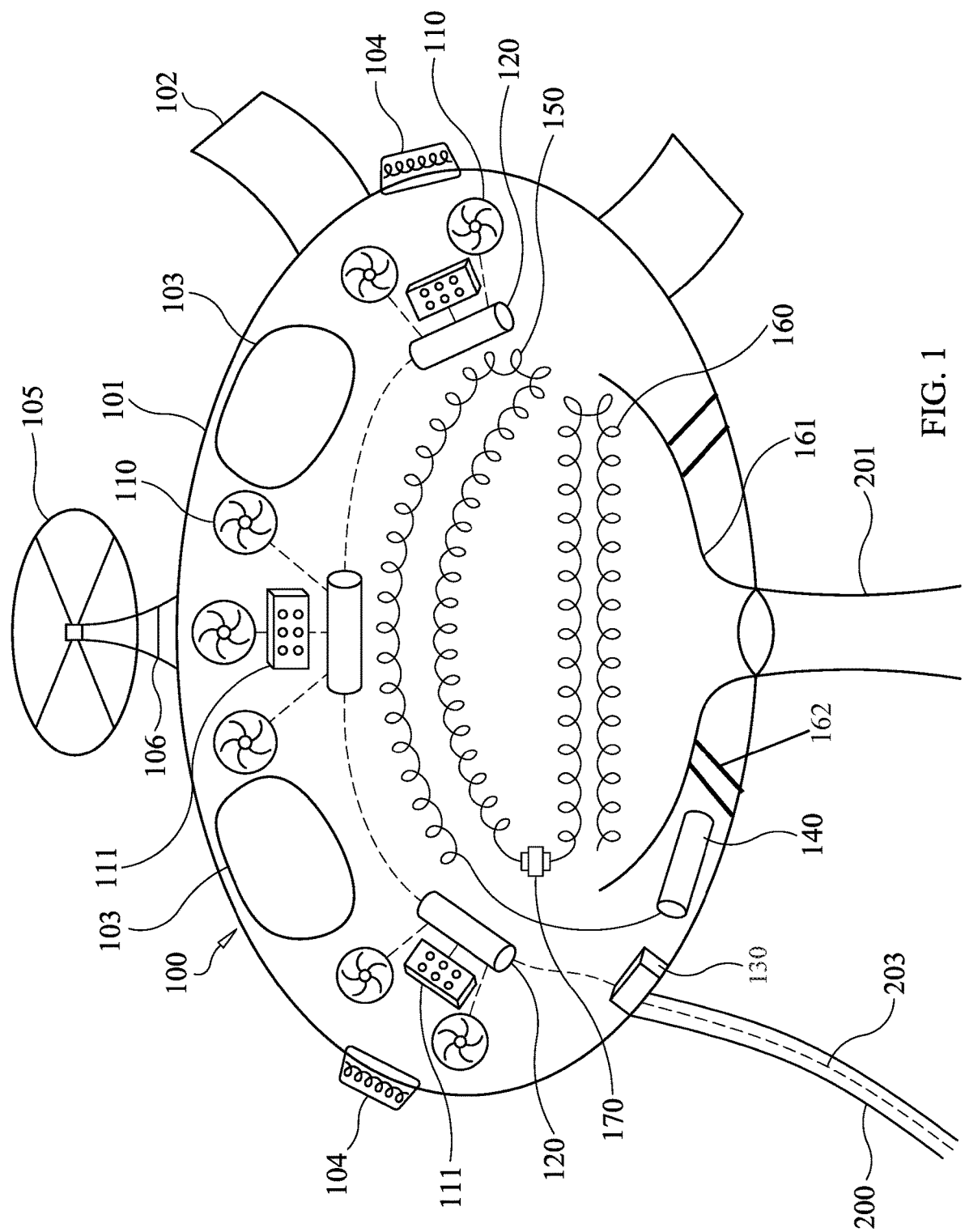
FIG. 1 is a line drawing evidencing an embodiment of an airborne platform component of an airborne atmospheric water generation system.

The invention as described and claimed herein is intended for the purposes of environment rejuvenation, such as converting humid deserts into vegetated landscapes, generating clean water for human consumption, cloud-to-water conversion technology, planetary terraforming and the creation of an artificial water vapor resupply cycle. As with any power device located in a remote or isolated area, power generation is a key problem to be solved. With the idea of repurposing water into hydrostatic pressure to enable a native power supply, each claim can be achieved via select applications to reduce external (direct current) power consumption and maintenance requirements.

AWG technology can consume the water vapor and ice crystals comprising a cloud through evaporator coil heating, using electrical air fans to pull in cloud matter for conversion. This technology has two primary components, an airborne device and a land-based device. Once condensed, the resulting liquid water flows from the airborne device down a water tube equipped with a control valve(s) to regulate gravity-induced hydrostatic pressure. This water pressure spins a turbine upon entering the land-based device, such turbine generating power that is repurposed into the onboard capacitor, amplifier, and compressor of the airborne platform. Weather management also can be achieved via the utilization of airborne AWG platforms to provision (flash) flooding reduction of severe storms while providing filtered water to service agriculture and human needs.

The system invention utilizes known methods of dehumidification. In practice, moist atmospheric air is drawn into the airborne platform by one or more air fans. This air passes into a crossflow plate heat exchanger where a substantial proportion of the sensible heat is transferred to a cool supply air stream. This process brings the extracted air close to saturation. The air then passes across the refrigerant-cooled evaporator coil of the heat pump where the air is cooled and the moisture is condensed. This process yields substantial amounts of latent energy to the refrigeration circuit. Fresh air is then introduced to replace the amount that was extracted and the mix is discharged by the supply fan (G) to the crossflow plate exchanger (B) where it is heated by the extract air from the pool. This pre-warmed air then passes through the heat pump condenser (F) where it is heated by the latent energy removed during the condensation process as well as the energy input to the compressor. The warm dry air is then discharged into the atmosphere. In a given embodiment, the system may further comprise a sensor-activated heater/blower (s) adjacent to the evaporator coils that engages upon sensing ice buildup on the coils.

In an alternate embodiment, the airborne platform comprises a desiccant-style dehumidifier, or a combination of compressor-style and desiccant-style dehumidifiers.

In a preferred embodiment, the power supply for the system is generated from the gravity-driven water pressure of the condensed water drainage, as captured by a water turban located in the land-based platform at the point where the condensation enters the case of such platform. Such turbine is preferably a rotary machine that converts the kinetic and potential energy of the downward-draining water into mechanical work, generating electric power. While a reaction turbine may be possible, since the condensation will gather velocity during its drainage path down the water tube from the airborne platform, the resulting jet at the point of entry to the land-based platform makes the use of an impulse turbine ideal. In another embodiment, two or more drainage tubes and respective turbines may be employed. In such an embodiment, the multiple turbines may connect to a single generator, or to respective generators, each powering a subset of the system's electrical components.

Power generation from the downward pressure of the water will be substantial, as the water contained in a single nimbus cloud is massive. Calculation of available power is determined by the equation:

$$P_{th}=pqgh$$

where
$P_{th}$=power theoretically available (W)
p=density (kg/m$^3$) (~1000 kg/m$^3$ for water)
q=water flow (m$^3$/s)
g=acceleration of gravity (9.81 m/s$^2$)
h=falling height, head (m)

For example, a cloud with a density of 1000 kg/m$^3$ of water with the device deployed at 5,000 meters (falling height) and a water flow rate (using a 6 in diameter tubing) of 0.17877 m3/s with gravity at 9.81 m/s$^2$ would yield a theoretic power of 8.76 MW.

Applicant notes that the power generative yield of the above example assumes the entire cloud would be condensed without substantial water velocity deviations, which is accounted for by the addition of one or more water valves to accumulate storage pools of water by which the water flow can be manipulated and, with the addition of a pressure valve at or within the drainage tube, downward force can be increased to also increase electric power yields.

DETAILED DESCRIPTION OF THE FIGURES

FIG. 1 shows a cross-section of an airborne atmospheric water generating platform 100, embodied as a blimp-like structure. In this embodiment, the airborne platform would gain altitude using helium or another lighter-than air gas contained in one or more bladders 103, either inside the platform structure or attached to it. Alternative embodiments could be structured as rotor-lifted aircraft, powered either by conventional gasoline or diesel engines, solar power, self-generated power from water pressure, or a combination of different sources. In FIG. 1, both gas bladders 103 within shell 101 as a primary source of levitation and a rotor 105 and rotor motor 106, as an optional and supplemental source of levitation are pictured. The lift force required for a given platform to reach a given altitude will depend on the size and mass of the airborne platform In FIG. 1, the airborne platform 100 comprises a shell/frame 101 connected to the ground and/or land-based platform 300 (not pictured) with tether line(s) 200 and connected to the land based platform with drainage tube(s) 201. The shell/frame shall be comprised of a framework of structural beams, rods or similar components of lightweight material(s) including but not limited to aluminum, aluminum-zinc alloys, titanium or a similar metal or alloy, carbon fiber, fiberglass or polymers such as those listed herein below, combined with an optional outer membrane of material such as durable fabric or very light sheet metal. Fabrics for use in the shell cover and/or catch basin 161, could include, without limitation, canvas, ultra high molecular weight polyethelene, carbon fiber, glass fiber, aramid or para-aramid fabrics. In a preferred embodiment, the shall/frame components would be jointed to allow for an acceptable degree of flexibility in response to wind pressure or a physical concussion, such as a landing impact. Such jointing could take any known form including but not limited to bolting, snap-fitting, pinning and/or spring-loading for shock absorption. Components of the shell/frame require sufficient strength to support the weight of the fans, electrical and dehumidifier components.

Within the shell 101, a plurality of air fans 110 are located intaking surrounding air and passing such air across or through a crossflow heat exchanger 111, optionally to include an expansion valve (not pictured) to harvest the water vapor within. The fans and all other electronic components within the shell are powered via one or more power lines 203, each attached to a tether line running to a ground-based power source, each such power line first connecting an amplifier 130, then running on to power various components within the airborne platform. In the figure, power lines run from the amplifier to a compressor 140 and a plurality of capacitors 120, which store power and then deliver current to respective air fans for either intake or exhaust of air through the shell. It is also possible that additional power lines could run from solar panels or wind turbines mounted on the shell 101 to provide an alternate power source(s).

FIG. 1 further indicates a classic compression-type dehumidifier model, wherein a compressor 140 compresses a refrigerant (for example, without limitation, commercially known chlorofluorocarbons, hydrochlorofluorocarbons, or hydrofluorocarbons) in gas form and pumps it through a set of condenser coils 150, where the gas heats and becomes a liquid, with the condenser coils dissipating the heat. The refrigerant liquid then passes through an expansion valve(s) 170 and into separate evaporator coils 160, where the refrigerant expands into a gas, thereby dropping in temperature and cooling the evaporator coils before returning to the compressor. The expansion valves provide dynamic resistance and flow control over the amount of refrigerant released into the evaporator.

Air is taken in by an air fan(s) 110, which then pushes the air over the cold evaporator coils 160 to lower the air temperature and effect condensation of the airborne water vapor into liquid water, which gathers on the evaporator and drips downward into catch basin 161, while the air is pulled across the heated condenser coils 150 before being ejected as exhaust by air fans. The catch basin is embodied as a funnel with a diameter sufficient to circumnavigate the full evaporator and condenser coil structure, wherein the catch basin drains towards an attached drainage tube 201, which exits through a lower portion of the shell and drains the captured liquid to the land-based platform 300. The catch basin will be comprised of either a water-resistant rigid material such as plastic or a fabric as described herein above, be supported with a plurality of catch basin supports 162, which supports will be comprised of durable materials such as plastic or metal and connected to the lower inner surface of the shell/frame 101. Preferred materials for the catch basin supports and catch basin would include, without limitation, carbon fiber, heat resistant plastics such as polyimide, polyamide-imide, polyphenylene sulfide, polyphenylene oxide, polyvinyl chloride, polytetrafluoroethylene and polystyrene, or lightweight and oxidation-resistant metals or alloys such as aluminum, titanium, and nickel-based alloys, or similar commercially known polymers, fibers, metals or other materials. Functioning together, the air fans, compressor, condenser coils, evaporator coils and expansion valves comprise a dehumidifier.

In an alternate embodiment, the compression-style dehumidifier of FIG. 1 may be replaced with an alternative technology using liquid, or "wet" desiccants such as lithium chloride or lithium bromide to pull water from the air via hygroscopic processes. A similar technique is also practicable combining the use of solid desiccants, such as silica gel and zeolite, with pressure condensation.

Also pictured in FIG. 1 are fins 102 attached to the airborne platform shell 101 for maintaining an even airflow over the platform, as well as a tether 200 extending from the shell to the ground below to hold the platform in place and as a point of attachment for power line 203.

As the condensed water enters the catch basin 161 and the drainage tube 201, the effect of gravity on the water generates an increasing pressure level in the downward direction. The drainage tube will contain one or more control valves 202 that can be adjustably opened and closed to manage the pressure level.

Applicant believes that clouds providing optimal harvest for the device will reside at the altitude between 1000-23,000 ft. Assuming an average cloud is at 12,000 ft in altitude and with an intake rate of 20 gallons per minute (gpm), and utilizing the formula $$P_{th}=pqgh$$

as detailed herein above, the result would yield a 24 kW output per each minute in operation. A cloud with 8 million (conservative estimate of nimbus-type clouds) gallons of water vapor would (assuming the aforementioned variables are the same) accumulate 9,600 MW of power over the course of 277 days.

Given the size of most clouds, these calculations involve extremely conservative values and thus a significantly higher rate of power generation is likely. A more liberal (and optimal) estimate would yield to 4,000 gpm which (using the same variables) would accumulate 4.8 MW each minute thus, yielding a total of 9,600 MW available power over the course of 1.3 days. This rate of generation could power a small township for a month.

Figure 2:
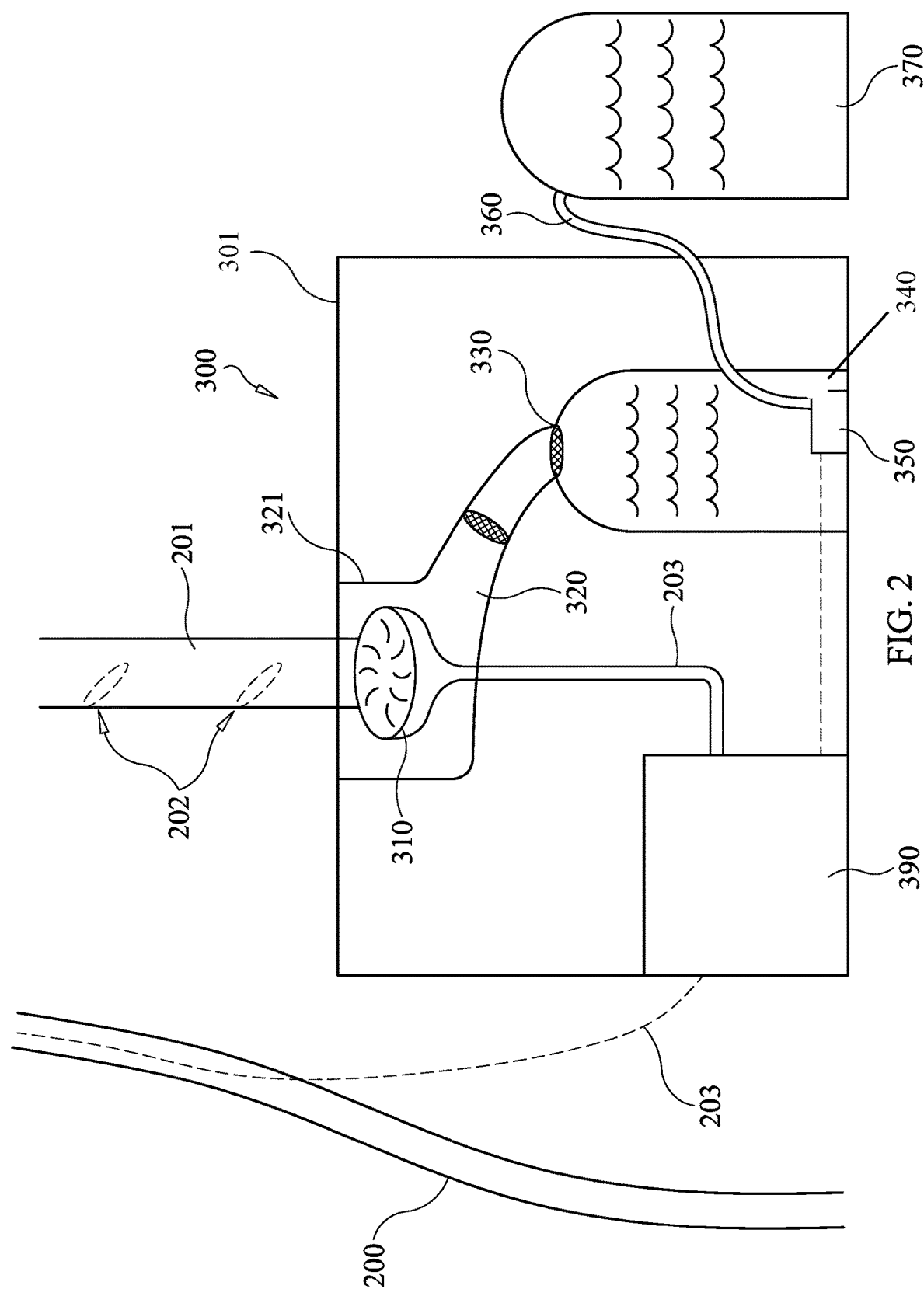
FIG. 2 is a line drawing evidencing a second embodiment of an airborne platform component of an airborne atmospheric water generation system, employing a hot air balloon.

FIG. 2 illustrates the drainage tube enters the case 301 of the land-based platform 300 and ejects into a turbine 310, which generates current from the water pressure and transmits that current to a generator 390, which then connects via power line 203 back to the amplifier 130 of FIG. 1. Once the condensed water passes through the turbine, it proceeds downward into a collection tank pipe 320, which pipe contains one or more activated carbon filters 330, which remove unwanted salts, metals, chemicals and other contaminants which accumulate in atmospheric water vapor and could render the water unsafe for human or animal consumption or agricultural use. Filters may also capture ice and allow it to melt before passing through to the collection tank. Also pictured is a tether 200 connecting the airborne platform 100 to the ground, and also serving as a point of connection for one or more power lines 203.

Further illustrated in FIG. 2, after passing through the filters, the water is captured in a collection tank 340 seated on the floor of the land-based platform case 301, which collection tank contains a water pump 350 connected by a power line to the generator 390. The generator will create usable wattage by electromagnetic induction, using the rotational energy produced by the turbine to spin a coil of conductive wire inside a magnetic field. This generator technology is well known and the generator components are thus not pictured. The water pump pumps water from the collection tank into and through a holding tank pipe 360 and into a holding tank 370 for eventual removal for transportation, further treatment as needed and final use.

Figure 3:
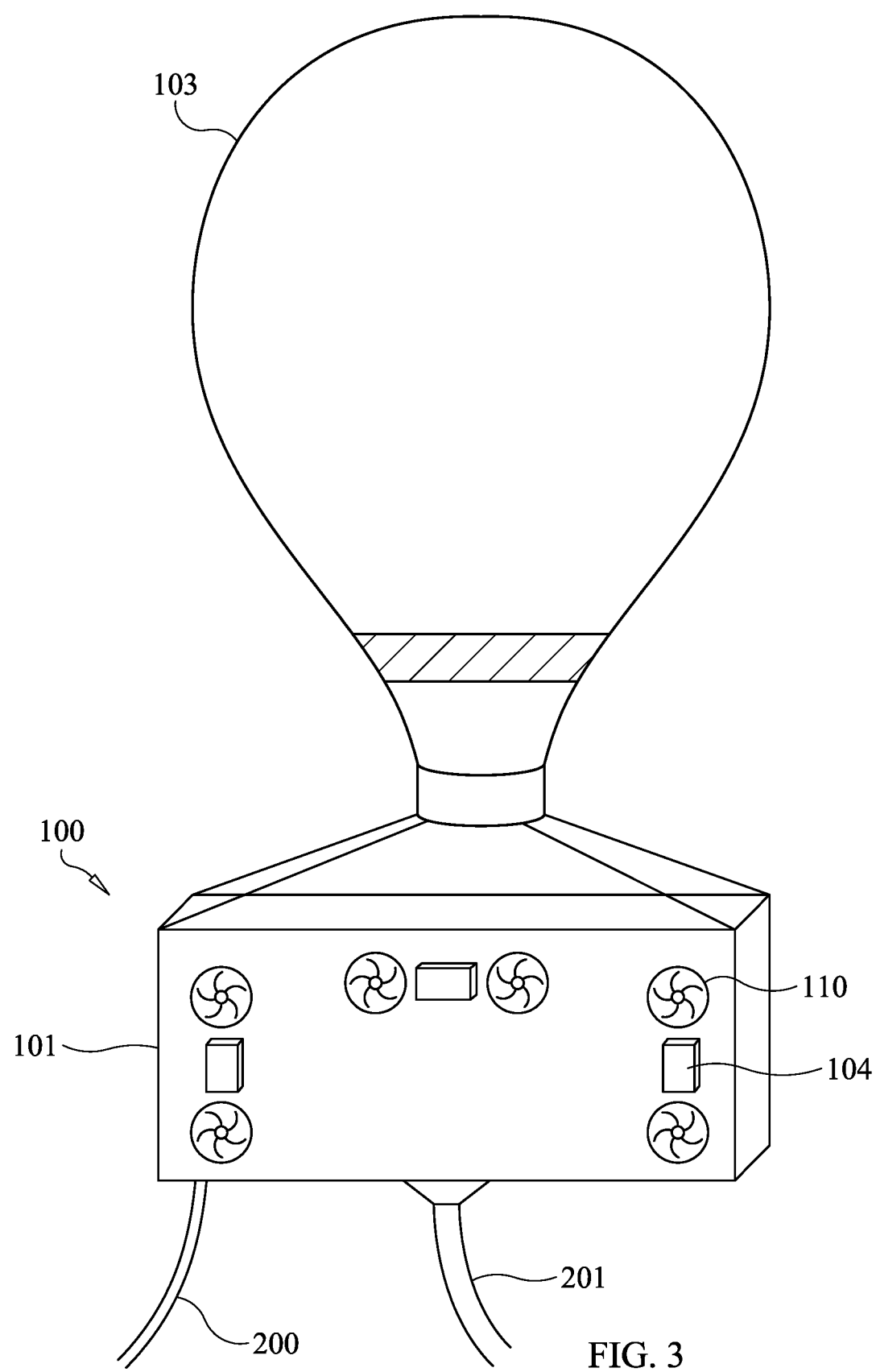
FIG. 3 is a line drawing evidencing the land-based platform component of an airborne atmospheric water generation system.

FIG. 3 illustrates another embodiment of the airborne platform 100, in which the levitation bladder 103 is embodied as a hot air balloon, suspended from which is the shell/frame 101, now embodied as a box containing all other components shown, including electrical components and wiring, intake fans and all dehumidifier components, to be arranged as in the embodiment of FIG. 1. As with FIG. 1, intake fans 110 and heating elements 104 appear on the outside of the shell/frame 101, with tether line 200 and drainage tube 201 connecting to the land based platform (not pictured).

In one embodiment, the drainage tube further comprises a nozzle 204 (not pictured) at its lower end to build pressure and focus that pressure on the water turbine 310 beneath. In this embodiment, the water turbine is best embodied as an impact turbine. In another embodiment, no nozzle is provided, but the water turbine is located within a portion turbine basin 321 of the collection tank pipe 320, with such turbine basin formed to fill with condensation and thus submerge the turbine completely. In such embodiment, the water turbine is best embodied as a reaction turbine.

INDEX OF PARTS

100 Airborne Platform
101 Shell/frame
102 Fins
103 Levitation bladder
104 External heating elements
105 Rotor
106 Rotor motor
110 Air Fan
111 Crossflow heat exchanger
120 Capacitor
130 Amplifier
140 Compressor
150 Condenser Coils
160 Evaporator Coils
161 Catch basin
162 Catch basin supports
170 Expansion Valves
180 Wires
190 Tethers
200 Tether line
201 Drainage tube
202 Control valve
203 Power line
204 Nozzle
300 Land based platform
301 Case
310 Water turbine
320 Collection tank pipe
321 Turbine basin
330 Filters
340 Collection tank
350 Water pump
360 Holding tank pipe
370 Holding tank
380 Generator line
390 Generator The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

I claim:

1. A system for airborne atmospheric water generation, comprising an external holding tank and an airborne platform connected to a land-based platform, wherein the airborne platform comprises air fans to intake atmospheric air containing water vapor, a dehumidifier condenses water from the vapor and drains the condensed water to the land-based platform and exhaust air fans to vent dehumidified air back into the atmosphere, the land-based platform comprises a water turbine and generator for generating electric power for all electrical components of the system, a collection tank for accumulating the condensed water, wherein a power line from the generator connects to an amplifier in the airborne platform, then extends to one or more capacitors, which capacitor(s) are each connected to one or more of the air fans, wherein the electrical components comprises the amplifier and the capacitor.

2. The system of claim 1, further comprising wherein the condensed water is drained to the land-based platform using a drainage tube comprising a nozzle focused on the water turbine and wherein the water turbine is an impact turbine.

3. The system of claim 1, further comprising wherein the condensed water is drained to the land-based platform using a drainage tube emptying into a turbine basin, wherein the water turbine is a reaction turbine and fully submerged when operating.

4. The system of claim 1, further comprising wherein the collection tank comprises a water pump for moving water from the collection tank to the holding tank, such water pump powered by electricity from the generator.

5. The system of claim 1, wherein the airborne platform elevates via one or more levitation bladders containing a gas lighter than air.

6. The system of claim 5, wherein the levitation bladder(s) is one or more hot air balloons, from which the airborne platform suspends.

7. The system of claim 1, wherein the airborne platform elevates via one or more powered rotors, either alone or in combination with one or more levitation bladders.

8. The system of claim 1, further comprising a dessicant-type dehumidification system in the airborne platform, either in addition to or in lieu of a compression-type dehumidification system.

9. A method of self-powering the atmospheric water generation system of claim 1, comprising the steps of
  i. levitating the airborne platform containing the dehumidifier;
  ii. dehumidifying the atmospheric air at altitude;
  iii. draining the condensed water from the airborne platform via a drainage tube, thus producing hydrostatic pressure;
  iv. using the hydrostatic pressure to power the water turbine;
  v. generating the electric power from the water turbine; and
  vi. providing the generated electric power to some or all of the electrical components of the system.

10. The method of claim 9, wherein the drainage tube comprises a nozzle aimed at the water turbine, and wherein the water turbine is an impact turbine.

11. The method of claim 9, wherein the water turbine is seated in a turbine basin and submerged during system operation, and wherein the water turbine is a reaction turbine.

12. A method of hydrostatic power generation using the atmospheric water generation system of claim 1, comprising the steps of
  i. levitating the airborne platform;
  ii. dehumidifying the atmospheric air at altitude;
  iii. draining the condensed water from the airborne platform via a drainage tube, thus producing hydrostatic pressure;
  iv. using the hydrostatic pressure to power the water turbine;
  v. generating the electric power from the water turbine;
  vi. providing the generated electric power to some or all of the electrical components of the system; and
  vii. transmitting all the generated electric power beyond the system to a public or third party power grid.

* * * * *